UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING LEAD CHLORID.

984,525. Specification of Letters Patent. Patented Feb. 21, 1911.

No Drawing. Application filed August 12, 1910. Serial No. 576,846.

*To all whom it may concern:*

Be it known that I, EDWIN O. BARSTOW, a citizen of the United States, and a resident of Midland, county of Midland, and State of Michigan, have invented a new and useful Improvement in Methods of Making Lead Chlorid, of which the following is a specification, the principle of the invention being herein explained and the best mode in which I have contemplated applying that principle, so as to distinguish it from other inventions.

My present invention, relating as indicated to a method of making lead chlorid ($PbCl_2$), has as its object the provision of a process for making such chlorid directly from metallic lead and commercial chlorin.

To the accomplishment of this and related objects said invention, then, consists of the steps hereinafter fully described and particularly pointed out in the claims.

The following description sets forth in detail one mode of carrying out the invention, such disclosed mode, however, constituting but one of the various ways in which the principle of the invention may be used.

As has been indicated I propose to use chlorin directly in the carrying on of my improved process, and to this end make a solution of the chlorin in water by bringing the gas into contact with the water, preferably in a coke-packed saturating tower into which the gas is led and over which the water is caused to flow. The resulting "chlorin water" as the solution is called, is then caused to act upon metallic lead to form the lead chlorid, the reaction being as follows:—

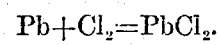
$$Pb + Cl_2 = PbCl_2.$$

This operation is conveniently conducted in a tank into which the lead, previously granulated (as by pouring it while molten into water), is charged, and through which the chlorin water, obtained as above, is run. It is desirable that provision be made in such tank for prolonged and thorough contact between the chlorin water and the lead, and with this in view the tank may be partitioned in a zig-zag manner, or by other equivalent devices, a long path of flow secured for the chlorin water. The lead chlorid that is formed by the reaction of the chlorin in such water with the metal, being sparingly soluble, passes into solution, so that one to two per cent. (1% to 2%) chlorid solution, containing no free chlorin, flows from the solution tank. Such solution of lead chlorid may be conveniently used just as it comes from the tank in the production of other lead salts, where lead chlorid itself is not the ultimate product desired. Thus to form lead carbonate or lead arsenate, sodium carbonate or sodium arsenate, respectively, would be added directly to such solution. If, however, the chlorid is the product sought, it will be desirable to obtain such chlorid in crystalline form. A further step in the present process will accordingly be the recovery of the chlorid in this form from the solution resulting from the above described reaction. To obtain such desired crystalline product, I take advantage of the fact that the solubility of lead chlorid in water is lowered by cooling; the process, then, is conducted in the following manner, the cycle of operations being repeated as often as desired until enough of the chlorid has been separated out. A cool saturated lead chlorid solution, such as would flow from the leach tank above referred to, is warmed or heated and then treated with more chlorin, it being immaterial in which order the two operations of heating and chlorinating are conducted. The resulting lead chlorid solution with its content of free chlorin is then passed through a tank filled with metallic lead, wherein the free chlorin unites with the metal to form additional lead chlorid. The latter going into solution increases the percentage of such chlorid so that when the solution is cooled again, part of the chlorid will crystallize out. The clear, cool, saturated lead chlorid solution is next separated from the crystals, as by decantation, and then reheated and rechlorinated, and is again subjected to the same cycle of operation to obtain a further quantity of crystals.

I have found that the action of the dissolved chlorin on the lead is greatly accelerated if pieces of carbon or graphite be mixed with the lead in the leaching tank. This action of the carbon in accelerating the solution of the lead would seem to be an electro-chemical one, although no experimental research has been conducted by me to establish that opinion. A convenient form of carbon for this purpose is obtainable, as scrap graphitized carbon, which may be crushed or not as desired. By the use of such carbon I find it possible to work satisfactorily with a far smaller weight of lead in the solution tank than as though no carbon were used. This feature is of importance because thereby less capital requires to be tied up in process, while a closer "clean-up" at the end of a run is likewise obtainable. While, as indicated, it is preferred to use graphite carbon, other forms of carbon such as coke, gas carbon and the like may be used.

By the process which I have thus described it will be seen that the direct production of lead chlorid from the metal and chlorin is rendered possible, a result which so far as I am aware has never heretofore been obtained in commercial practice. The success of the present method I attribute in part to the elimination of the action of the air by first absorbing the chlorin in water and then treating the lead in the dissolved chlorin in the substantial absence of the air; for I have found that if it be attempted to produce the chlorid by treating metallic lead with water and commercial chlorin simultaneously, as by passing the gas into an absorption tower, or other chamber, packed with lead, over which water is caused to trickle, lead peroxid will also be formed, presumably because of the presence of air in the gas, and, this peroxid being insoluble, it will form a protective coating over the lead so as to prevent, or at least seriously hinder further action of the chlorin thereon.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a process of making lead chlorid, the step which consists in treating metallic lead with chlorin in solution.

2. In a process of making lead chlorid, the step which consists in treating finely divided metallic lead with chlorin in solution.

3. In a process of making lead chlorid, the step which consists in treating granulated metallic lead with chlorin water.

4. In a process of making lead chlorid, the step which consists in treating metallic lead with a solution of chlorin in the presence of carbon.

5. In a process of making lead chlorid, the step which consists in treating finely divided metallic lead, intermingled with carbon, with chlorin water.

6. In a process of making lead chlorid, the steps which consist in absorbing chlorin in water, and then bringing the chlorin water thus made into contact with metallic lead.

7. In a process of making lead chlorid, the steps which consist in absorbing chlorin in water, and then bringing the chlorin water thus made into prolonged contact with metallic lead in a finely divided state.

8. In a process of making lead chlorid, the steps which consist in absorbing chlorin in water, and then bringing the chlorin water thus made into prolonged contact with granulated lead intermingled with carbon.

9. In a process of making lead chlorid, the steps which consist in absorbing commercial chlorin in water, so as to eliminate any air, and then bringing the chlorin water thus made into contact with granulated lead intermingled with pieces of graphite.

10. In a process of making lead chlorid, the steps which consist in absorbing chlorin in a solution of lead chlorid, bringing the resulting solution into contact with metallic lead, and then cooling the solution until a portion of the lead chlorid crystallizes out.

11. In a process of making lead chlorid, the steps which consist in warming a solution of lead chlorid and absorbing chlorin therein, bringing the resulting solution into contact with metallic lead, and then cooling the solution until the additional lead chlorid, formed by the action of such absorbed chlorin on the lead, crystallizes out.

12. In a process of making lead chlorid, the steps which consist in warming a solution of lead chlorid and absorbing chlorin therein, bringing the resulting solution into contact with metallic lead, and then cooling the solution until a portion of the lead chlorid crystallizes out; and then repeating the preceding steps with the residual solution.

13. In a process of making lead chlorid, the steps which consist in treating metallic lead with chlorin water, absorbing chlorin in the solution of lead chlorid thus obtained, bringing the resulting solution in contact with metallic lead, and then cooling the solution until a portion of the lead chlorid crystallizes out.

14. In a process of making lead chlorid, the steps which consist in treating finely divided lead with chlorin water, absorbing chlorin in the solution of lead chlorid thus obtained, warming the resulting solution and absorbing chlorin therein, bringing the resulting solution into contact with metallic lead, and then cooling the solution until the additional lead chlorid, formed by the action of such absorbed chlorin on the lead, crystallizes out.

15. In a process of making lead chlorid, the steps which consist in absorbing chlorin in a solution of lead chlorid, bringing the resulting solution into contact with metallic lead in the presence of carbon, and then cooling the solution until a portion of the lead chlorid crystallizes out.

16. In a process of making lead chlorid, the steps which consist in warming a solution of lead chlorid and absorbing chlorin therein, bringing the resulting solution into contact with metallic lead and carbon, and then cooling the solution until the additional lead chlorid, formed by the action of such absorbed chlorin on the lead, crystallizes out.

17. In a process of making solid lead chlorid, the steps which consist in warming a solution of lead chlorid and absorbing chlorin therein, bringing the resulting solution into contact with metallic lead intermingled with carbon, and then cooling the solution until a portion of the lead chlorid crystallizes out; and then repeating the preceding step with the residual solution.

18. In a process of making solid lead chlorid, the steps which consist in treating metallic lead with chlorin water, absorbing chlorin in the solution of lead chlorid thus obtained, bringing the resulting solution in contact with metallic lead intermingled with carbon, and then cooling the solution until a portion of the lead chlorid crystallizes out.

19. In a process of making solid lead chlorid, the steps which consist in treating finely divided lead with chlorin water, absorbing chlorin in the solution of lead chlorid thus obtained, warming the resulting solution and absorbing chlorin therein, bringing the resulting solution into contact with granulated lead intermingled with carbon, and then cooling the solution until the additional lead chlorid formed by the action of such absorbed chlorin on the lead crystallizes out.

Signed by me this 8th day of August, 1910.

EDWIN O. BARSTOW.

Attested by—
 Leo W. Lowe,
 Thos. Griswold, Jr.